US006772376B1

(12) United States Patent
Merkin et al.

(10) Patent No.: US 6,772,376 B1
(45) Date of Patent: Aug. 3, 2004

(54) SYSTEM AND METHOD FOR REPORTING DETECTED ERRORS IN A COMPUTER SYSTEM

(75) Inventors: Cynthia M Merkin, Georgetown, TX (US); Abeye Teshome, Austin, TX (US); Stuart D. Caffey, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 608 days.

(21) Appl. No.: 09/705,104

(22) Filed: Nov. 2, 2000

(51) Int. Cl.[7] .............................................. G06F 11/00
(52) U.S. Cl. ........................ 714/48; 379/9.04; 714/26
(58) Field of Search ............................ 714/48, 57, 26, 714/27, 46; 709/223; 379/9.03, 9.04

(56) References Cited

U.S. PATENT DOCUMENTS

| | | | |
|---|---|---|---|
| 4,141,006 A | | 2/1979 | Braxton ...................... 340/505 |
| 5,748,884 A | | 5/1998 | Royce et al. ............. 395/185.1 |
| 5,815,652 A | | 9/1998 | Ote et al. ............... 395/183.07 |
| 5,884,073 A | * | 3/1999 | Dent ............................. 713/2 |
| 5,945,915 A | | 8/1999 | Cromer et al. ........... 340/686.1 |
| 5,978,912 A | | 11/1999 | Rakavy et al. ................. 713/2 |
| 5,984,178 A | | 11/1999 | Gill et al. ................... 235/379 |
| 6,003,081 A | * | 12/1999 | Cromer et al. .............. 709/224 |
| 6,038,689 A | | 3/2000 | Schmidt et al. ............... 714/48 |
| 6,061,742 A | | 5/2000 | Stewart et al. .............. 709/250 |
| 6,065,136 A | * | 5/2000 | Kuwabara .................... 714/31 |
| 6,178,528 B1 | * | 1/2001 | Poisner ........................ 714/48 |
| 6,298,457 B1 | * | 10/2001 | Rachlin et al. ............... 714/49 |
| 6,349,335 B1 | * | 2/2002 | Jenney ........................ 709/224 |
| 6,477,667 B1 | * | 11/2002 | Levi et al. .................... 714/57 |
| 6,567,937 B1 | * | 5/2003 | Flores et al. .................. 714/46 |
| 6,606,716 B1 | | 8/2003 | Vrhel et al. ................... 714/32 |

OTHER PUBLICATIONS

Intel, Platform Event Trap Format Specification v1.0, Dec. 7, 1998, Revision 1.0.*
Microsoft Computer Dictionary, 1999, Microsoft Press, Fourth Edition, pp. 437.*
Dell U.S.A.: Stedman, et al., U.S. Pending patent application Ser. No. 09/413,599 entitled "Graphical Interface, Method, and System for the Provision of Diagnostic and Support Services in a Computer System", Filed Oct. 6, 1999.
Dell U.S.A.: Huber, et al., U.S. Pending patent application Ser. No. 09/465,569 entitled "System and Method for Monitoring Support Activity", Filed Dec. 17, 1999.
Dell U.S.A.: Huber, et al., U.S. Pending patent application Ser. No. 09/413,523 entitled "System and Method for Monitoring Support Activity", Filed Oct. 6, 1999.
Dell U.S.A.: Sloan, et al., U.S. Pending patent application Ser. No. 09/245,148 entitled "Method and Apparatus for Diagnosing and Conveying and Identification Code in Post on a Non–Booting Personal Computer", Filed Feb. 4, 1999.

* cited by examiner

Primary Examiner—Robert Beausoliel
Assistant Examiner—Marc Duncan
(74) Attorney, Agent, or Firm—Baker Botts L.L.P.

(57) ABSTRACT

A method and system for reporting detected errors in a computer system. The computer system includes a processor, communication device, and subsystems. The communication device preferably includes a preprogrammed reporting address associated with a technical support center. When an error is detected within the system, an error specific message is generated. The communication device then sends the error message to the preprogrammed address. The technical support center, resident at the preprogrammed address receives the error message and is able to more effectively respond to the detected error message.

18 Claims, 1 Drawing Sheet

SYSTEM AND METHOD FOR REPORTING DETECTED ERRORS IN A COMPUTER SYSTEM

TECHNICAL FIELD

The present invention relates generally to the field of computer systems, and more particularly, to a system and method for reporting errors detected within a computer system to a predetermined location.

BACKGROUND

Computer systems perform a wide variety of roles in business, educational and personal computing. As the functions that computer systems perform become more varied, identifying and correcting errors, malfunctions and other problems becomes a more complicated task. Many times, after a computer system develops a problem or malfunction, a user will contact a technical service center to evaluate and correct the problem. However, it is often difficult for a user to accurately diagnose the problem, especially for a user unfamiliar with computer systems. Consequently, it may be difficult for a user to correctly describe the malfunction or problem to a service technician. This communication breakdown often results in a misdiagnosis of the malfunction delaying the eventual solution or repair of the computer system. Such misdiagnosis consumes valuable resources including the user's time and the time of the service technician. A user may lose the use of the computer system during this period, often leading to significant frustration and loss of productivity. Also during this time, the service technician is unable to assist other users.

If a problem cannot be resolved through contact with a technical support center, diagnosing problems or malfunctions often requires a technician to physically examine the computer system. This may require either that the computer system or some of its components be physically transported to a technical support center, or that a service technician travel to the location of the computer system for inspection.

Once in possession of the computer system, a service technician may use a number of techniques, specialized tools, or testing equipment to properly diagnose a computer system malfunction. Often, computer systems may incorporate diagnostic programs and hardware that detect certain errors or malfunctions. Once an error is detected, a diagnostic program may generate an error message indicating the type of problem that has been identified. These error messages can be reported in a standardized format, such as the Platform Event Trap model.

SUMMARY

Therefore, a need has arisen for a method and system for communicating detected errors to a technical support center.

In accordance with the teachings of the present disclosure, a system and method are provided that substantially reduce the disadvantages and problems associated with previous methods of reporting errors, faults, malfunctions, or other problems within a computer system. In one aspect of the present disclosure, a communication device receives messages regarding errors or faults detected within a computer system, and reports these messages to a preprogrammed reporting address. These messages can then be used in providing remote error or fault diagnosis and technical support.

For example, in one embodiment, a system is disclosed that includes a preprogrammed address of a technical support center associated with the system manufacturer programmed into a communication device. If an error occurs when the system is powered on, the system's Basic Input Output System (BIOS) may detect that error and send a selected error message to the communication device that then sends an alert to the preprogrammed address of the technical support center. The technical support center, associated with the preprogrammed address, receives the alert and sends an email to a service technician, who may then contact the user to notify them of the error and suggest a solution.

More specifically, in one embodiment a system is provided for reporting detected errors in a computer system having a network interface card with non-volatile storage. The manufacturer of the computer system may program the non-volatile storage with a selected or designated network address of a technical support center. When an error is detected within the computer system, an error message is generated and sent to the network interface card, which in turn sends the error message to the preprogrammed network address. The technical support center associated with the preprogrammed network address receives the error message and is able to direct technical support assistance to the user in response to the error message. More specifically the network address may be a TCP/IP address.

A method is also provided for the reporting of detected error message that includes maintaining a communication device with one or more preprogrammed reporting addresses. The method further includes receiving the error message from an associated computer system, and transmitting the error message to one or more of the preprogrammed reporting addresses.

The present disclosure provides many important technical advantages. One such advantage is that the method and system sends a detected error or fault message to a technical support center without involvement of the user. Another advantage is the ability to transmit and diagnose errors without having previously booted an operating system, or even the ability to boot the operating system. Since the address to which the error messages are preferably transmitted are preprogrammed, there is no need to boot the operating system to configure the reporting address. Further, the system and method of the present invention can be implemented in computer systems having a variety of hardware and software configurations.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
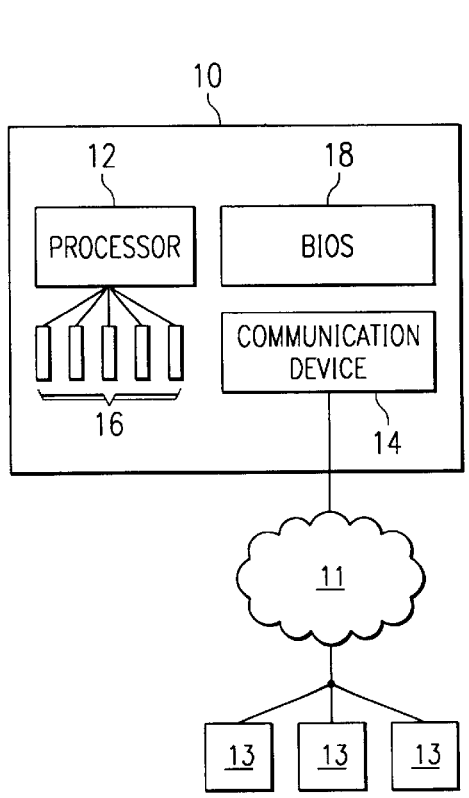
FIG. 1 depicts a block diagram of a computer system operable to report errors to one or more preprogrammed addresses.
Figure 2:
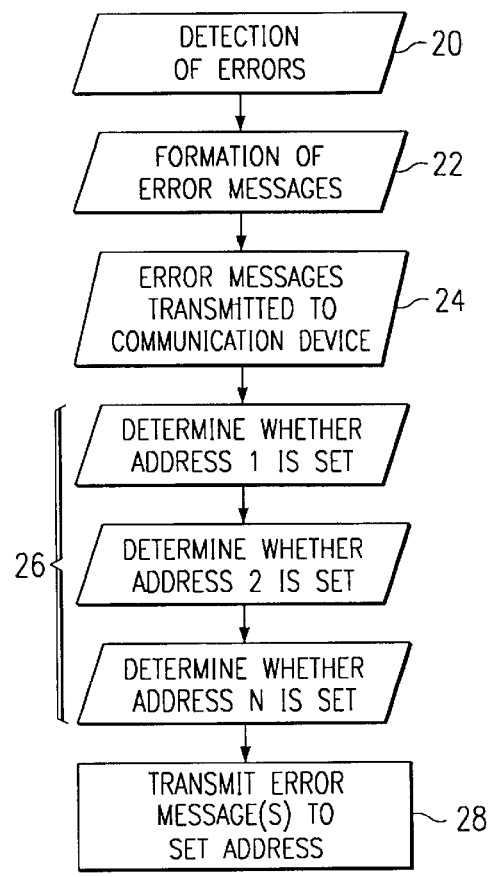
FIG. 2 depicts a flow diagram of initiation of an error or fault message after an error is detected by the computer system.
Figure 3:
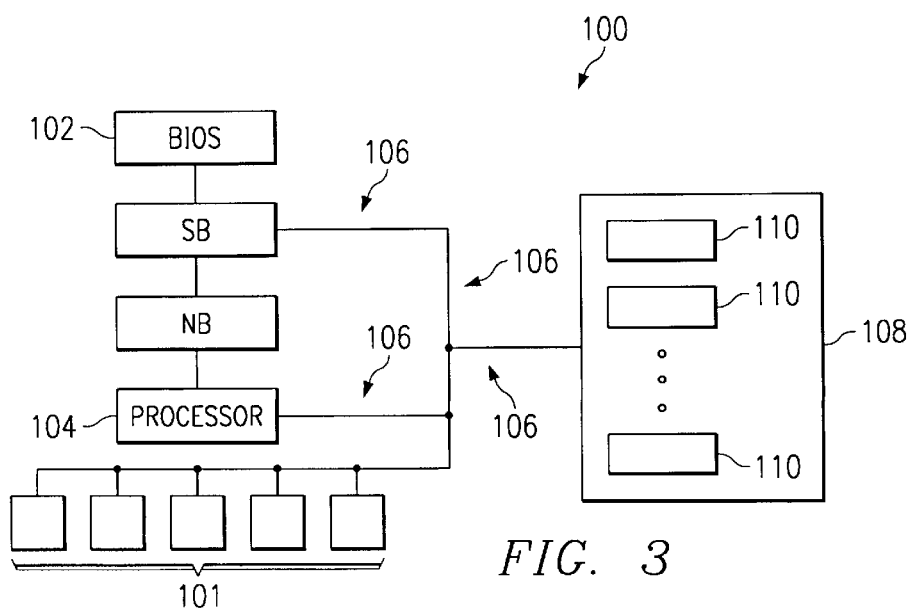
FIG. 3 depicts a block diagram of the hardware and software elements utilized to report an error to a preprogrammed address.

Preferred embodiments of the present invention are illustrated in FIGS. 1–3, like numerals being used to refer to like and corresponding parts of the various figures.

Operating systems perform a number of functions within a computer system including interfacing communications between various system components and subsystems and interfacing with software such as the basic input/output system (BIOS) or device drivers. Operating systems also monitor hardware and software operations in a computer system. Operating systems may also detect errors or malfunctions within the computer system and generate fault or error messages identifying errors, malfunctions or problems. Error diagnostic systems such as help programs associated with the operating system may correct errors directly or through guided user interaction. However, if the operating system itself has a problem, or if a hardware problem prevents the operating system from booting, such problems may become more difficult to diagnose.

To improve computer system error detection, identification, and resolution, the present disclosure provides a monitoring system associated with a computer system's BIOS may monitor the operability of the computer system. The monitoring system may detect operating system boot failures, various types of operating systems hang-ups, and hardware errors, malfunctions or failures. Components within the computer system may also perform monitoring functions operable to detect faults and compatibility problems within the component. Once a problem is detected, action may be taken to correct the malfunction or error in accordance with the disclosure.

For instance, a computer system may be jostled during shipping, resulting in a memory module coming unseated. When a user opens the shipping box and turns the computer system on, the BIOS may detect that there is no memory available to the system. In accordance with the present disclosure, the BIOS may then send a "no system memory" alert to a communication device, which in turn may send this error message to a preprogrammed network address associated with a technical support center. The service technician at the network address will then be able to diagnose the problem and take appropriate action to resolve the problem. For instance, the service technician may contact the user, inform them of the detected error and suggest a solution. The manner in which the computer system's error messages are prepared and transmitted to a selected location, such as a technical support center, are described in more detail with reference to FIGS. 1–3.

Referring now to FIG. 1, a block diagram depicting computer system 10 having processor 12, communication device 14, plurality of subsystems 16, and BIOS 18. System 10 may be a server, work station, personal computer or another suitable computer system. Processor 12 may be a microprocessor such as, for example, an Intel Pentium 4 processor. Communication device 14 may be, for example, an Ethernet card, modem or other suitable communication device. Plurality of subsystems 16 may include, for example, storage devices, I/O devices and other subsystems and devices. Processor 12, communication device 14, plurality of subsystems 16, and BIOS 18 are preferably in communication with one another via one or more buses.

BIOS 18 or subsystems 16 may preferably detect a fault or error within system 10. BIOS 18 or subsystems 16 may further generate an error message related to the detected error or fault. This error message may then be transferred to communication device 14. The communication device 14, in turn, transmits the error message to one or more reporting addresses 13. Communication device 14 also preferably sends a system identification message to the preprogrammed reporting address. The system identification message preferably includes a system identifier such as a Universally Unique ID (UUID) or other identifier that allows the recipient to identify computer system 10. In one embodiment this transmission takes place over a network 11 such as an intranet, the Internet or another suitable communication network. In one embodiment the reporting address may be the network address of a technical support center. In another embodiment the reporting address may preferably be a network location associated with the original equipment manufacturer of computer system 10.

As indicated above computer system 10 provides a preferred system for reporting detected errors to a preprogrammed reporting address. In the present embodiment, the reporting address is preferably programmed during the manufacture of computer system 10. Referring now to FIG. 2, a flow diagram of the initiation of an error message after detection is shown. First step 20 includes the detection of an error within computer system 10 (as shown in FIG. 1). An error may be preferably detected either through the system BIOS or by an operating system level monitor. Errors may also be detected through monitors associated with component hardware devices or software applications. The next step 22 includes forming an error message describing the fault.

In one embodiment the error message may be formed in accordance with the Platform Event Trap format. However, error messages may be formed using various other formats related to the software applications or hardware component devices associated with computer system 10. After the error or fault message is formed, the error message is preferably transmitted to communication device 14, as show in FIG. 1, capable of receiving error message 24. The communication device then performs the next step 26, checking a series of locations for preprogrammed addresses. If these addresses are set, the communication device transmits the formed error message to the address found at 28. The communication device then checks the next location, repeating this process until all possible locations for addresses are checked. In an alternative embodiment, the communication device can check the address, and based upon predetermined settings associated with individual address, selectively transmit only designated error messages to the individual addresses.

Now referring to FIG. 3, one embodiment of computer system 100 including plurality of subsystems 101 and multiple programmable address is shown. Temperature sensors and fan monitors associated with subsystems 101(not expressly shown), communicate with BIOS 102, processor 104, and communication device 108 through an interconnect such as System Management Bus 106 (SMB). BIOS 102 and processor 104 communicate with the communication device 108 through SMB 106 as well. In one embodiment, communication device 108 is preferably a network interface card such as, for example, an Ethernet card or token ring communication device. Communication device 108 preferably includes reporting addresses of network locations stored in a non volatile memory medium 110. For example, addresses may be preferably stored on Electrically Erasable and Programmable Read Only Memory (EEPROM). In one embodiment reporting addresses are preferably stored in TCP/IP format, and may be preferably programmed before computer system 100 leaves the manufacturer. In one embodiment the preprogrammed reporting address is preferably the network location of a technical support center. In another embodiment the preprogrammed reporting address is preferably an address associated with an original equipment manufacturer of the computer. Also, additional reporting addresses may be configured by a user. For example, the user may selectively configure the communication device to transmit error messages to a support provider affiliated with the user or to another network address selected by the user.

In operation, when an error, fault or malfunction occurs within a subsystem 101, BIOS 102 can detect the error via SMB 106. When the BIOS detects an error 20, it may preferably formulate error message 22 as shown in FIG. 2. This error message may then be transmitted 24 through SMB 106 to communication device 108. Communication device 108 then checks non-volatile memory 110 for pre-programmed addresses; if an address is present, communication device 108 transmits the received error message to the location corresponding to that address 28. If multiple addresses are present, communication device 108 may preferably transmit the received error message to each address. Alternatively, communication device 108 may transmit the received error message to one or more selected addresses based upon the type of error message and pre-selected reporting criteria associated with the one or more reporting addresses.

The systems and methods of the present invention provide a system and method for reporting problems within a computer system. The manner in which the error messages are formed and transmitted to a preprogrammed address preferably requires no user intervention. Further, the system and method described above enable a detected fault or error to be communicated to a technical support center to preferably facilitate the resolution of the detected error or fault without a prior boot of the computer system.

Although the present invention has been described in detail, it should be understood that various changes, substitutions, and alterations can be made hereto without departing from the spirit and scope of the invention as defined by the appended claims.

What is claimed is:

1. A computer system for reporting detected errors to an external location, comprising:
   a processor;
   a BIOS associated with the processor operable to detect at least one computer system error;
   a communication device operably coupled to the processor and having at least one programmable reporting address;
   the communication device operable to transmit at least one detected error message associated with a computer system error detected by the BIOS to the programmable reporting address, the detected error message transmitted in Platform Event Trap format; and
   the at least one programmable reporting address including a preprogrammed reporting address.

2. The system of claim 1, wherein the at least one programmable reporting address further includes at least one user defined address.

3. The computer system of claim 1, wherein the communication device comprises a network interface card.

4. The computer system of claim 1, further comprising the preprogrammed reporting address in TCP/IP format.

5. The computer system of claim 1, further comprising the preprogrammed reporting address associated with a technical support center.

6. The computer system of claim 1, further comprising the communication device operable to receive a detected error message.

7. The computer system of claim 1 wherein:
   the communication device further comprises at least two programmable reporting addresses; and
   communication device operable to transmit selected error messages to at least one of the at least two programmable reporting addresses.

8. A communication device for reporting errors detected within a computer system, comprising:
   the communication device having a plurality of reporting addresses;
   the plurality of reporting addresses including a preprogrammed reporting address associated with a technical support center; and
   the communication device operable to transmit at least one detected error message to the preprogrammed reporting address, the detected error message transmitted in Platform Event Trap format, the at least one error message associated with a computer system error detected by a BIOS.

9. The system of claim 8, further comprising the plurality of reporting addresses including a user configurable reporting address.

10. The system of claim 8, wherein the communication device comprises a network interface card.

11. The system of claim 8, further comprising the preprogrammed reporting address in TCP/IP format.

12. The system of claim 8 further comprising the preprogrammed reporting address programmed during manufacture.

13. The system of claim 8, further comprising the communication device operable to automatically transmit error messages to the preprogrammed reporting address.

14. A method for reporting errors within a computer system, comprising:
   providing a communication device within the computer system;
   preprogramming at least one reporting address in the communication device;
   detecting at least one computer system error with a BIOS:
   receiving a detected error message from the BIOS; and
   transmitting the error message with the communication device to the at least one preprogrammed reporting address, the detected error message transmitted in Platform Event Trap format.

15. The method of claim 14, further comprising maintaining the communication device with at least one preprogrammed reporting address associated with a technical support center.

16. The method of claim 15 further comprising the technical support center associated with an original equipment manufacturer.

17. The method of claim 14, further comprising maintaining a network interface card having at least one preprogrammed reporting address and at least one user configurable reporting address.

18. The method of claim 14 further comprising programming the preprogrammed reporting address in the communication device during computer system manufacture.

* * * * *